United States Patent [19]

Spiesberger et al.

[11] 4,031,419
[45] June 21, 1977

[54] SELF-STARTING SYNCHRONOUS AND STEPPING MOTOR HAVING A PERMANENT MAGNET ROTOR

[75] Inventors: August Spiesberger, Lahr; Claus Schäffer, Heiligenzell, both of Germany

[73] Assignee: Gerhard Berger, Fabrik Elektrischer Messgeräte, Lahr, Germany

[22] Filed: July 28, 1975

[21] Appl. No.: 599,765

[30] Foreign Application Priority Data

July 31, 1974 Germany .......................... 2436886

[52] U.S. Cl. .............................. 310/49 R; 310/186
[51] Int. Cl.² ...................................... H02K 37/00
[58] Field of Search .................... 310/49, 162–165, 310/186, 190

[56] References Cited

UNITED STATES PATENTS

| | | | |
|---|---|---|---|
| 3,636,557 | 1/1972 | Watkins | 310/49 R X |
| 3,866,104 | 2/1975 | Heine | 310/49 R X |
| 3,875,437 | 4/1975 | Hara et al. | 310/49 |

Primary Examiner—Donovan F. Duggan
Attorney, Agent, or Firm—Toren, McGeady and Stanger

[57] ABSTRACT

A self-starting synchronous or stepping motor has at least two phases, a permanent magnet rotor and a stator including individually excited and inwardly facing main stator poles. The stator poles and rotor poles have a predetermined spacing of τp. The stator poles are combined in groups of alternate polarity. The groups are displaced by a predetermined angle. At least one windingless auxiliary stator pole of approximately one-half of the width of the main stator pole is provided per group in addition to the main stator poles. The total number of stator poles is at least equal to the number of rotor poles. Additional auxiliary poles may be either half-pole widths or pointed shape. Embodiments of two-phase and three-phase synchronous motors are disclosed.

10 Claims, 16 Drawing Figures

TWO-PHASE MOTOR
with 2p=8 and u=1

TWO-PHASE MOTOR
with $2p=8$ and $u=1$ place of rotor by:
$\Phi_1 = \Phi_2 = 0$
$\Phi_1 = \Phi_2 = \Phi_{max}/\sqrt{2}$ THREE-PHASE MOTOR
with $2p=12$ and $u=1$

TWO-PHASE MOTOR

THREE-PHASE MOTOR

TWO-PHASE MOTOR
with 2p=12 and u=2 place of rotor by:

$\Phi_1 = \Phi_{max}$ $\Phi_2 = 0$ (PRIOR ART)
Fig. 6
(PRIOR ART)
Fig. 6a
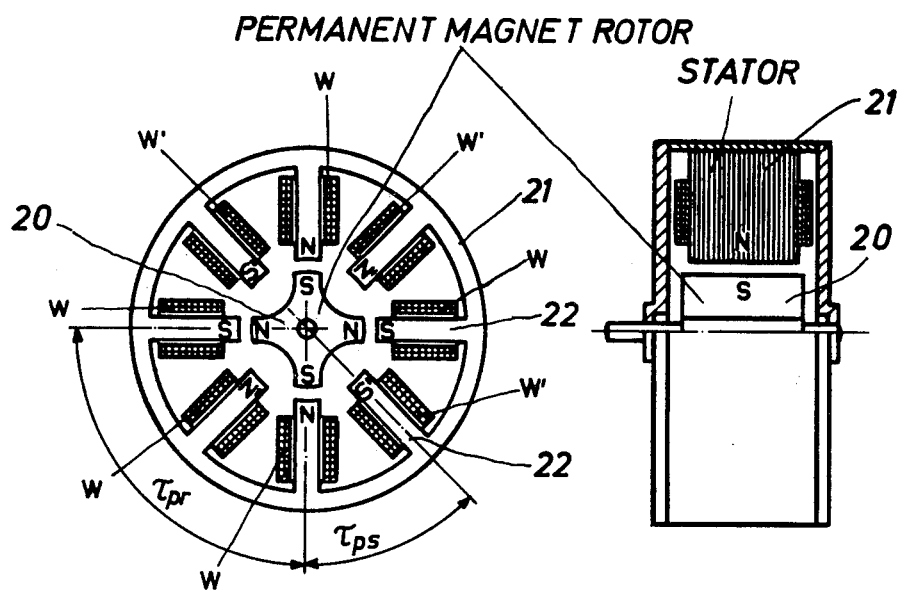
Fig. 6b
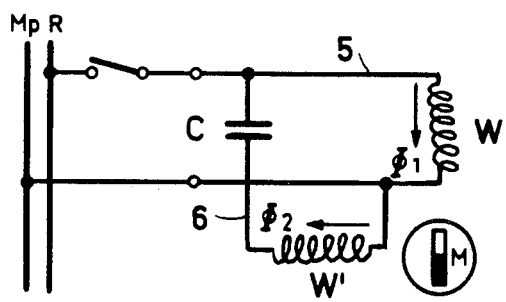

(PRIOR ART)
Fig. 8
(PRIOR ART)
Fig. 8b
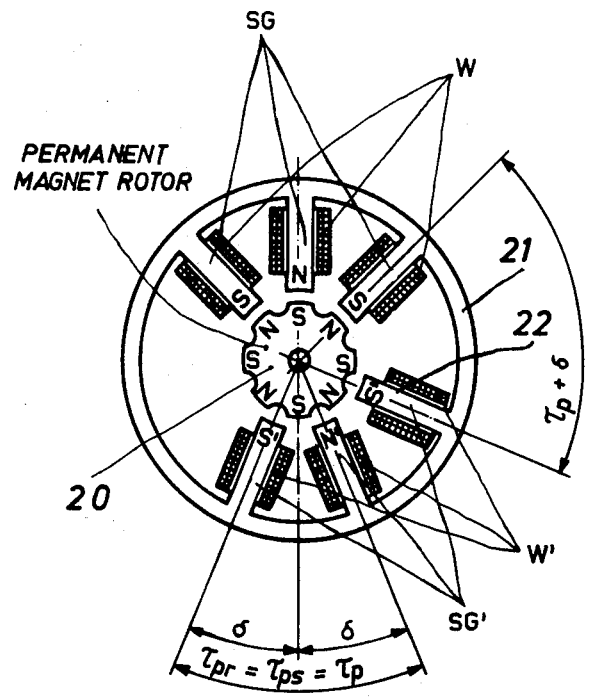
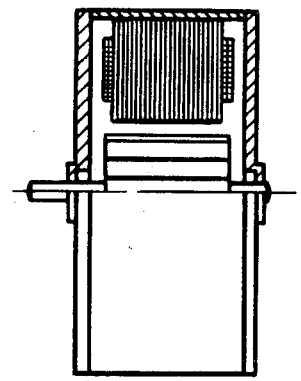
Fig. 8a
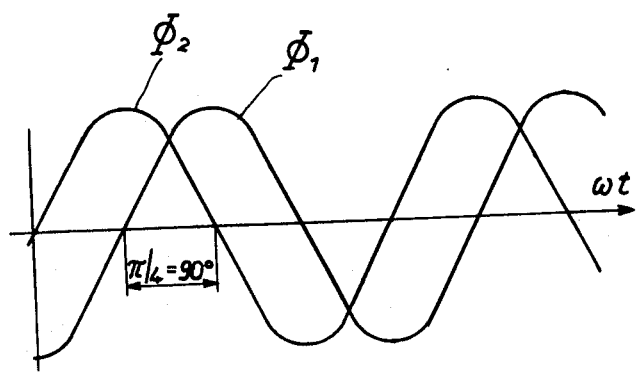
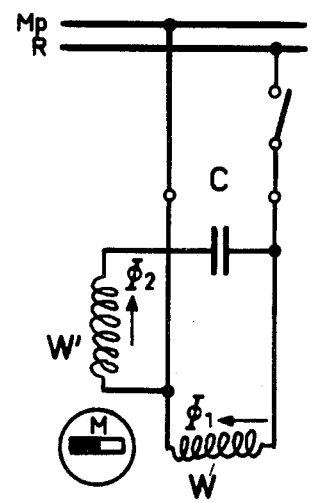

4,031,419

SELF-STARTING SYNCHRONOUS AND STEPPING MOTOR HAVING A PERMANENT MAGNET ROTOR

FIELD OF THE INVENTION

The present invention relates to synchronous motors and, more particularly, to two- or multiple-phase synchronous motors having alternating pole construction with inwardly directed and projecting stator poles and a multiple pole permanent magnet rotor. Applications of such motor, according to the invention, include its use as a two-phase motor, as a capacitance motor, as a rotary-current motor and as a stepping motor.

BACKGROUND OF THE INVENTION

Synchronous motors having inwardly projecting stator poles and a permanent magnet rotor are well known and are made in a variety of constructions. In order to have a self-starting motor with a permanent magnet rotor, it is necessary to keep the peripheral velocity of the rotor and the moment of inertia of the rotor small. Because of this, such motors are constructed exclusively as multiple-pole motors or motors having a small diameter.

One prior art approach to such synchronous motor construction employs a single stator structure, as shown in FIG. 6. In this figure, the multiple-pole rotor is designated as 20, the multiple-pole stator surrounding the rotor is designated as 21 and the inwardly projecting poles of the stator are designated as 22. Stator pole windings of different phases, $w$ and $w'$, are alternately disposed on the respective stator poles 22. The center-to-center pole spacing $\tau pr$ of the permanent magnet rotor must be made twice as large as that of the center-to-center pole spacing of the stator $\tau ps$ for a predetermined stator and rotor diameter. In this construction, the rotor assumes a disadvantageous rest position for self-starting purposes. While such single stator-type synchronous motors do have low manufacturing costs, they have not proved useful in practice, since the excitation power required for motor startup must be made much too large. This, in turn, results in an impermissible thermal overload of the stator windings and demagnetization of the permanent type magnet rotors results.

A considerable improvement of the thermal and electromagnetic properties of the synchronous motor has been accomplished by employing a construction where two single-phase systems are mechanically coupled and axially disposed in series. Such a construction is shown in FIGS. 7a and 7b. Again, in this figure, 20 represents the rotor of the motor I, 21 represents the stator of that motor, and 22 represents the inwardly projecting poles (corresponding prime numbers refer to similar elements of motor II). Note that all of the stator poles of motor I are excited by one phase while all of the stator poles of II are excited by the second phase. The manufacturing costs of synchronous motors constructed in this fashion are, however, considerably greater than those of a motor having a single stator.

Attempts have been made, therefore, to combine the favorable features of both motor systems without having to accept their poor or disadvantageous aspects. For this purpose, the stator pole for both windings $w$ and $w'$, having respective excitation fluxes $\Phi_1$ and $\Phi_2$, were not symmetrically disposed on the inner stator circumference about a diameter, but were grouped together in stator-pole groups SG and SG' per phase, as shown in FIG. 8. In this figure, 20 is the rotor, 21 the stator and 22 the inwardly projecting pole. The center-to-center interpole spacing of the rotor and the spacing within the stator pole groups has been set equal to $\tau p$.

Stator-pole groups of the individual phases were displaced on the inner circumference of the stator by a spatial displacement angle $\delta = \tau p/m$, which displacement angle is required for a rotating field (wherein $m$ denotes the number of phases). FIG. 8a illustrates the excitation circuitry and the associated electrical displacement of the phases.

The solution thus derived for a synchronous motor having a single stator had, for example, in an eight-pole, two-phase machine with the pole pairs $p = 4$, the number of exciting coils reduced from 16 to 6. In this arrangement, only a single permanent magnet was required for the rotor and the awkward pairing of the rotor magnets in the FIG. 7 embodiment was dispensed with. This resulted in a very significant reduction in manufacturing costs. A patent application for this motor principle has been filed and published as German Patent Application No. 2,337,905.

A volumetric comparison of the efficiency and power output of the motor described in FIG. 8 with the motor of FIG. 7, shows that the single-stator type synchronous motor of FIG. 8 has reduced power and efficiency. It is believed that this inefficiency is a result of poor utilization of the available stator space and of the permanent magnet.

SUMMARY OF THE PRESENT INVENTION

It is an object of the present invention to provide a synchronous motor having improved electromagnetic efficiency and power while remaining of small size and also having self-starting qualities.

It is another object of the present invention to provide a synchronous motor having improved starting and synchronous torque.

It is still another object of the present invention to provide a synchronous motor having improved efficiency and employing windingless poles to make full utilization of available stator space.

It is a further object of the present invention to provide additional magnetic paths between stator and rotor in a synchronous motor in order to increase the generation of torque.

It is still a further object of the present invention to provide a synchronous motor construction which would orient the rotor to a preferred starting position.

It is an additional object of the present invention to provide a synchronous motor construction having a large stopping torque.

In accordance with the present invention, in a self-starting synchronous motor of the type having $m \geq 2$ phases, a permanent magnet-type rotor with a plurality of alternately polarized poles, a stator including individually excited and inwardly facing main stator poles, both said stator and rotor having an interpole center-to-center angular distance of $\tau_p$, wherein the stator poles are combined in u groups of alternate polarity per phase which are spatially displaced from each other by an angle $\tau p/m = \delta = 180°/m \cdot p$, where $p$ is the number of pole pairs of the rotor, an improvement is provided. The improvement comprises that at least one windingless auxiliary stator pole of approximately one-half of the width of the main stator poles is provided per group and per phase in addition to the main stator poles. The total number of stator poles is at least equal to the number of rotor poles.

For better understanding of the present invention, reference is made to the following description and accompanying drawings while the scope of the invention will be pointed out in the appended claims.

BRIEF DESCRIPTION OF THE DRAWINGS

In the drawings:

FIG. 6 is a cross-sectional view and FIG. 6a is a side view of a synchronous motor using prior art construction.

FIG. 6b is a schematic representation of an electrical energizing circuit for the motor of FIG. 6.

FIG. 7b is a partially cross-sectional side view of the motor of FIG. 7a.

FIG. 8 is a cross-sectional view and FIG. 8b is a partially cross-sectional side view of still another prior art construction.

FIG. 8a is a schematic illustration of the electrical circuit for driving the motor and the relative relationship between the phases $\Phi_1$ and $\Phi_2$.

DESCRIPTION OF THE INVENTION

Figure 1:
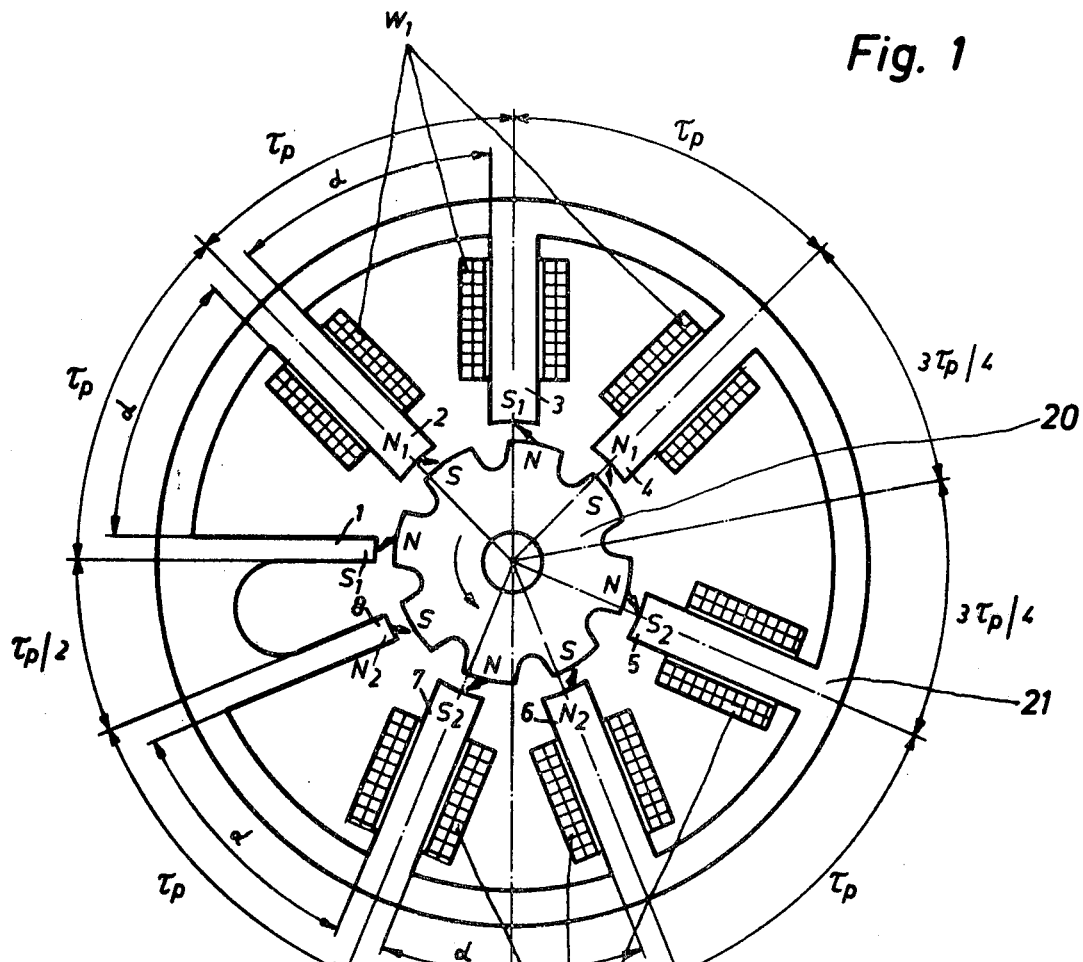
FIG. 1 represents a cross-sectional view of a two-phase motor in accordance with the present invention.
Figure 1A:
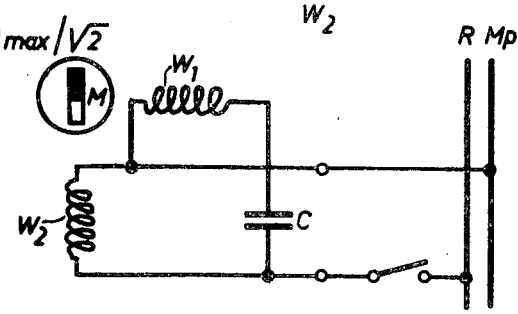
FIG. 1a depicts a circuit diagram showing the electrical excitation of the motor of FIG. 1.

Referring initially to FIG. 1, shown there is a central rotor 20 having a plurality of alternately polarized poles. A stator 21 has a number of inwardly projecting poles. The main stator poles are designated 5, 6 and 7, and 2, 3 and 4. On main stator poles 2, 3 and 4, a winding $w_1$ is disposed for individual excitation of these poles. On stator poles 5, 6 and 7, a winding of a different phase $w_2$ is disposed. The excitation circuit for windings $w_1$ and $w_2$ is shown in FIG. 1a.

In order to increase the starting and synchronous torque generated by the motor, further stator poles were added. These poles, 1 and 8, which are designated as auxiliary poles, do not carry any windings and are dimensionally about one-half as wide as main poles 2 through 7. The interpole angular spacing $\alpha$ between adjacent main poles of a stator pole group and between main poles and adjacent auxiliary poles, are equal, as seen in FIG. 1. Note that the stator pole groups and the pole-to-pole spacing of auxiliary poles 1 and 8 is $\tau_p$ over the number of phases, or in this case, $\tau_p/2$. In the FIG. 1 embodiment, $p$, the number of rotor pole pairs, equals 4 and the number of groups $u$ per phase equals 1.

As a result of this construction, one obtains therefore, three, instead of two magnetic paths closed through the rotor in this two-phase motor embodiment. All three magnetic paths contribute to the torque of the motor. This increase in torque is equal to or greater than 30 percent without resulting in an increase in the absorbed power.

A second major advantage of the arrangement of poles, according to the invention, is that the rotor always assumes a very exact and rigid starting position. This occurs because the two auxiliary poles 1 and 8 function to center the permanent magnet rotor to the mid-position which is most effective for the starting of synchronous motors with permanent magnets. This simultaneously results in a very large stopping torque which is particularly important for control motors having a large counter-torque in a current-free state and, also, when employed as stepping motors.

Figure 5:
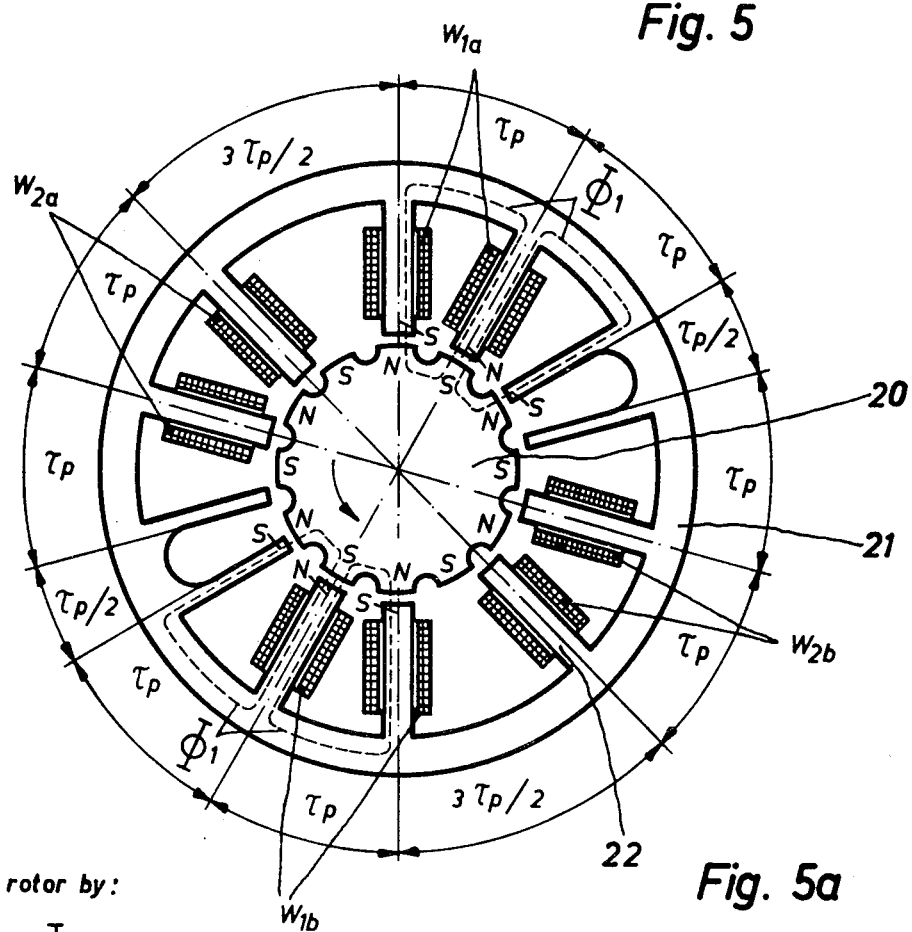
FIG. 5 is still another embodiment of a two-phase motor in accordance with the present invention shown in cross-section.
Figure 5A:
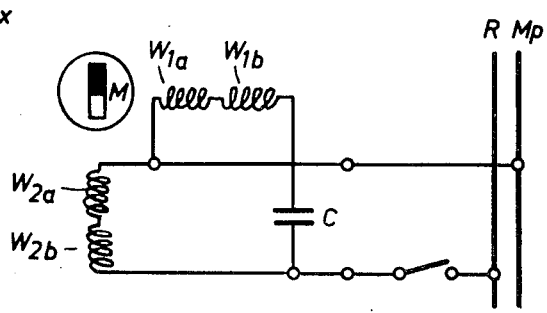
FIG. 5a is a schematic representation of an electrical energizing circuit for the motor depicted in FIG. 5.
Figure 7A:
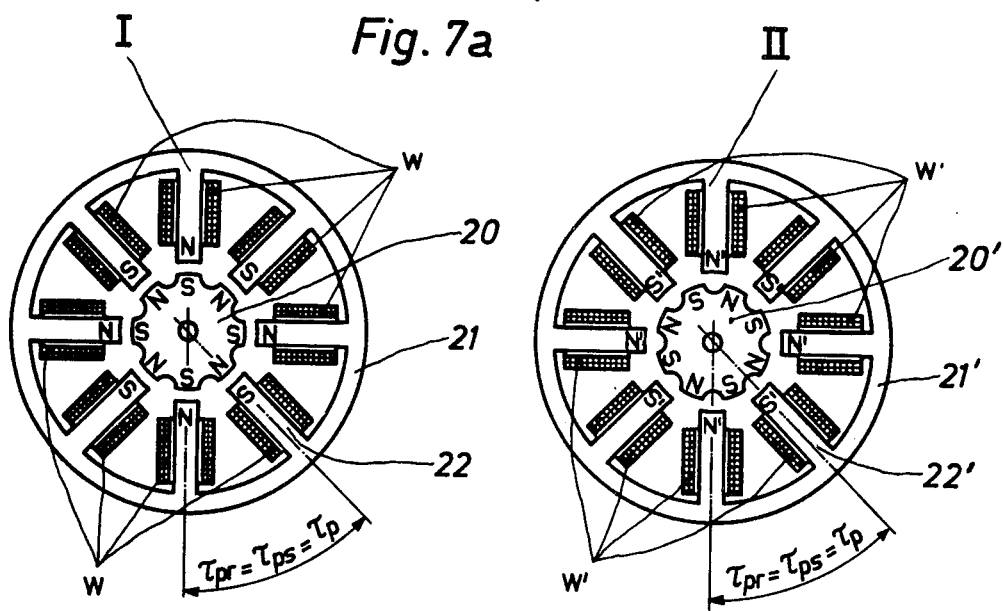
FIG. 7a, I and II show cross-section views of another motor using prior art construction.
Figure 7B:
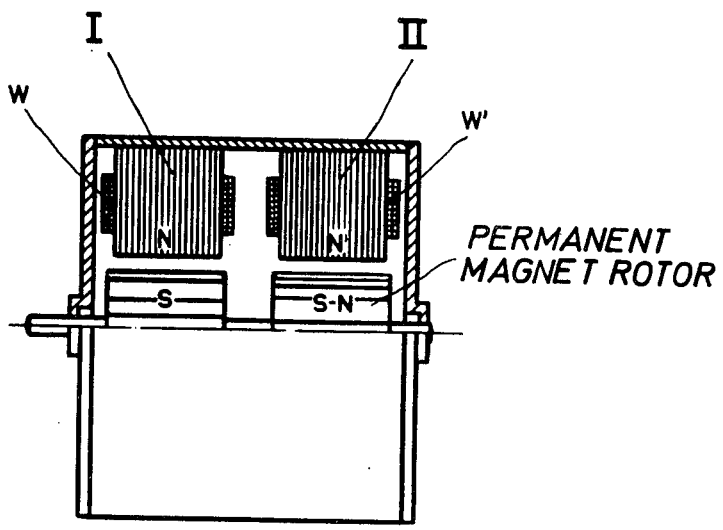

The principle of the motor of the present invention having auxiliary poles can, of course, be applied to motors having a large number of rotor poles. In such a case, it would be advantageous to increase the group number, $u$, of the stator poles and to arrange them in such a way that two pole groups of a respective phase are disposed opposite each other. Such a construction is shown, for example, in FIG. 5. FIG. 5 is an illustration of a two-phase motor having six pole pairs of the rotor ($p = 6$). There are two groups of stator poles per phase ($u = 2$). Here again, 20 represents the permanent magnet rotor, 21 represents the stator and 22 are the inwardly directed poles. Each stator pole group comprises two main poles with associated windings and a single auxiliary pole of half-pole width. The stator poles excited by winding $w_{1a}$ are disposed opposite to the poles excited by winding $w_{1b}$. Windings $w_{1a}$, $w_{1b}$ are the same as shown in the schematic diagram in FIG. 5a.

Figure 2:
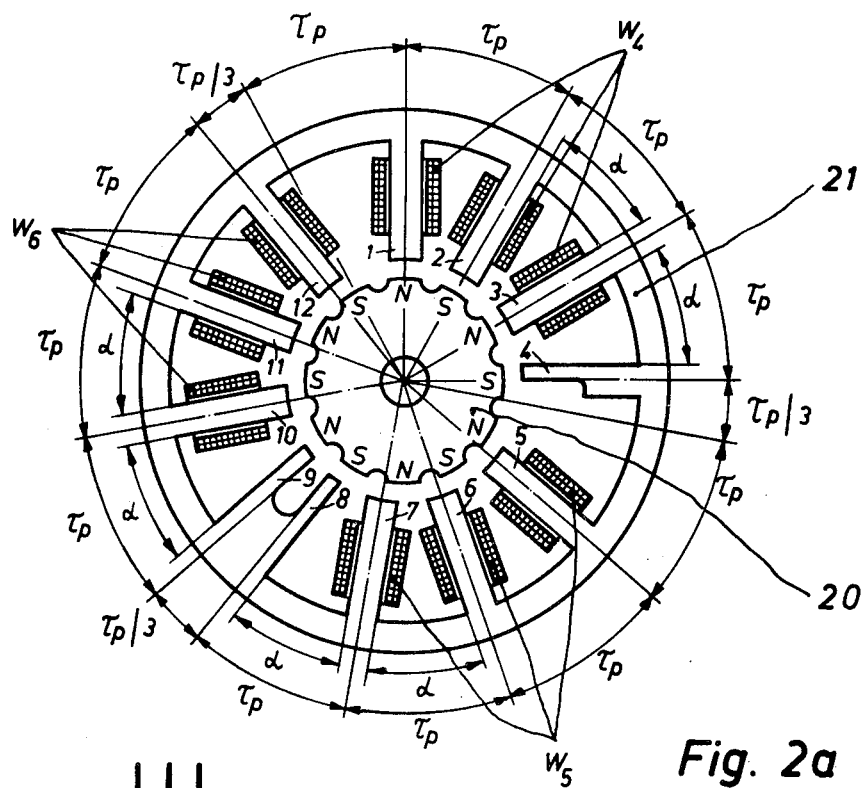
FIG. 2 is a cross-sectional representation of a three-phase motor in accordance with the present invention.
Figure 2A:
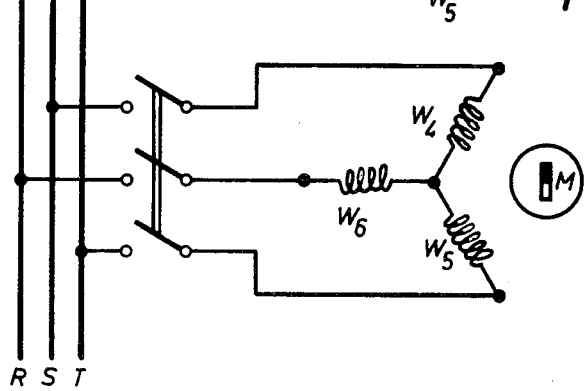
FIG. 2a is a schematic circuit diagram of the electrical excitation of the motor of FIG. 2.

The basic motor principle according to the present invention can equally be applied to motors having more than two phases. FIG. 2 illustrates, for example, a stator section for a three-phase motor having $2p = 12$ poles, and a pole group displacement angle $\tau_p/3$. In the figure, the permanent magnet rotor is designated as 20, the stator as 21, and the main poles as 1, 2, 3, 5, 6, 7 and 10, 11, 12. The auxiliary poles are shown as 4, 8 and 9.

Figure 3:
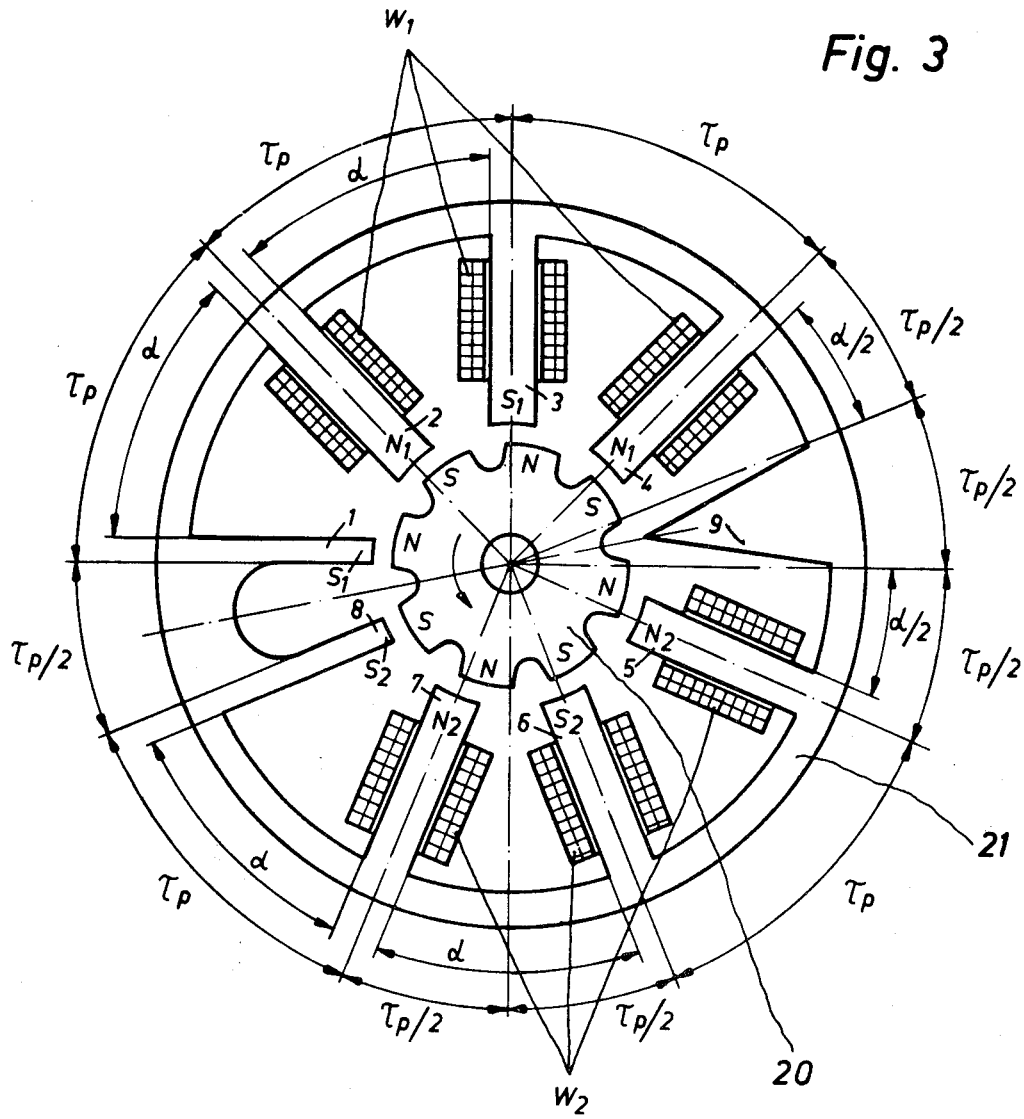
FIG. 3 is an embodiment of a two-phase motor in accordance with the present invention shown in cross-section.
Figure 4:
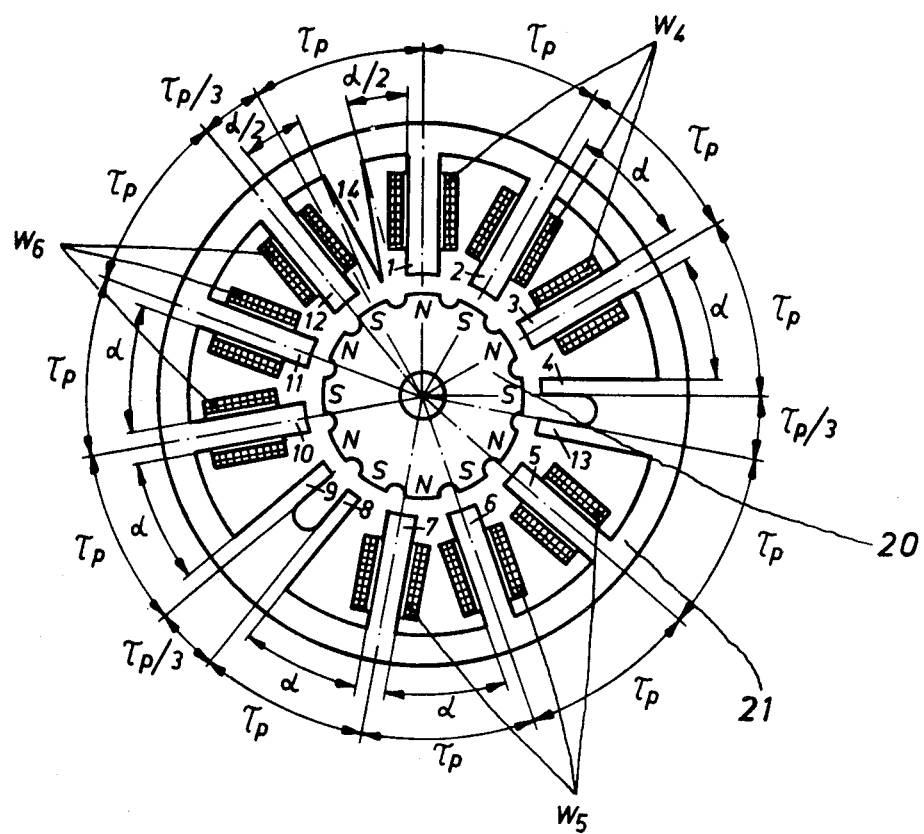
FIG. 4 is another embodiment of a three-phase motor in accordance with the present invention shown in cross-section.

It should be noted that the integral devisibility of the rotor pole number $2p$ by the number of phases $m$ is a precondition of the applicability of the principle of the present invention for multiple-phase motors. It has been proven correct for all stator pole arrangements in accordance with the invention to select a ratio V equal to the number of main stator poles divided by the number of rotor poles so that $V = 0.666$ or 0.75. A further improvement of generated torque can be provided (even if not as significant as the earlier mentioned auxiliary poles) by the addition of further auxiliary poles. This may be seen in reference to FIGS. 3 and 4 showing two and three-phase motors with such construction. In FIG. 3, the motor having a rotor 20 and stator 21, includes an additional auxiliary pole 9 disposed opposite to the half-pole width auxiliary poles 1 and 8. Similarly, in FIG. 4, the motor having rotor 20 and stator 21, includes additional auxiliary poles 13 and 14. Auxiliary pole 13 is of similar half-pole width; however, pole 14 in the motor of FIG. 4 and pole 9 in the motor of FIG. 3 necessarily have a pointed shape because of space limitations. The interpole angular distance between the auxiliary pole 9 and an adjacent main pole is equal to $\alpha/2$ in the motor of FIG. 3. Similarly, the pole 14 is disposed with an α/2 interpole distance with respect to the main poles in FIG. 4.

With the arrangement of auxiliary poles as provided according to the present invention, the available inner space of the stator is optimally exploited. The manufacturing cost of motors in accordance with the present invention in comparison with those in accordance with German Application P 23 37 906.7 remains approximately the same. The electrical and mechanical characteristics and the net power and efficiency of the motor are demonstrably improved as a result of a newly added auxiliary poles.

Motors in accordance with the present invention can, of course, be also used as a stepping motor, as can any synchronous motor having discrete rotor poles. Here, in order to save control means, it will be advantageous for the stator windings to be wound in a bifilar fashion and to connect the winding ends in known manner to the control transistors.

While various embodiments of the present invention have been described and illustrated below, it is intended that all variations and modifications which would be obvious to an individual of ordinary skill in the art, be encompassed by the true spirit and scope of the invention.

What is claimed is:

1. In a self-starting synchronous motor of the type having $m \geq$ two phases, a permanent magnet-type rotor with a plurality of alternately polarized poles, a stator including individually excited and inwardly facing main stator poles, both said stator and rotor having an interpole center-to-center angular distance of $\tau_p$, said stator poles being combined in u groups of alternate polarity per phase which groups are spatially displaced from each other by an angle $\tau_p/m = \delta = 180°/m \cdot p$, where p is the number of pole pairs of the rotor, the improvement comprising that at least one windingless auxiliary stator pole of approximately one-half of the width of the main stator poles is provided per group and per phase in addition to the main stator poles, the total number of stator poles being at least equal to the number of rotor poles.

2. The motor of claim 1 wherein said motor is constructed as a stepping motor.

3. The motor of claim 1 wherein the motor includes an interpole angular distance α between adjacent main stator poles being equal to the angular distance between an auxiliary pole and an adjacent main pole.

4. The motor of claim 1 wherein the number of phases m is 2, the number of stator groups per phase $u = 1$, and the motor includes two opposing groups of three main poles and one auxiliary pole of half-pole width, so comprising eight stator poles altogether, each said opposing group of main poles being excited by windings of opposite phase respectively.

5. The motor of claim 1 wherein the number of phases m is 3, the number of stator groups per phase $u = 1$, and the motor includes three groups of three main poles and one auxiliary pole of half-pole width, so comprising 12 stator poles altogether, each group of main poles being excited by a respective phase winding.

6. The motor of claim 1 wherein the number of phases m is 2, the number of stator groups per phase $u = 1$, and the motor includes two groups of three main poles and one auxiliary pole of half-pole width and a further pointed auxiliary pole, so comprising nine stator poles altogether, said two auxiliary poles of half-pole width being disposed adjacent to each other and said pointed pole being disposed symmetrically opposite to said two adjacent auxiliary poles.

7. The motor of claim 6 wherein the main poles are separated by an interpole angular distance α and said pointed auxiliary pole is disposed an angular distance α/2 from the main poles.

8. The motor of claim 1 wherein the number of phases m is 3, the number of stator groups per phase $u = 1$, and wherein the motor includes three groups of three main poles and one auxiliary pole of half-pole width, a further auxiliary pole of half-pole width and a further pointed auxiliary pole, said auxiliary poles of half-pole width being disposed in pairs between sets of main poles, said pointed pole being disposed symmetrical between and opposite to the auxiliary pole pairs.

9. The motor of claim 8 wherein the main poles are separated by an interpole angular distance α and said pointed auxiliary pole is disposed at an angular distance of α/2 from the main poles.

10. The motor of claim 1 wherein the number of phases m is 2, the number of stator groups per phase $u = 2$, and wherein the motor includes four groups of two main poles and one auxiliary pole of half-pole width, said auxiliary poles being grouped in pairs, opposing main poles being excited by windings of the same phase.

* * * * *